United States Patent
Osuka et al.

(10) Patent No.: US 8,485,554 B2
(45) Date of Patent: Jul. 16, 2013

(54) STEERING DEVICE

(75) Inventors: Akio Osuka, Kyoto (JP); Ryota Okano, Hamamatsu (JP)

(73) Assignee: JTEKT Corporation, Osaka-Shi (JP)

( * ) Notice: Subject to any disclaimer, the term of this patent is extended or adjusted under 35 U.S.C. 154(b) by 366 days.

(21) Appl. No.: 13/047,169

(22) Filed: Mar. 14, 2011

(65) Prior Publication Data
US 2011/0227323 A1    Sep. 22, 2011

(30) Foreign Application Priority Data
Mar. 19, 2010    (JP) ................................ 2010-064419

(51) Int. Cl.
*B62D 1/11*    (2006.01)
*B62D 1/18*    (2006.01)

(52) U.S. Cl.
USPC ................ 280/777; 280/775; 74/492; 74/493

(58) Field of Classification Search
USPC ............................ 280/777, 775; 74/492, 493
See application file for complete search history.

(56) References Cited

U.S. PATENT DOCUMENTS
2006/0043722 A1    3/2006 Hoshino et al.
2006/0290128 A1    12/2006 Ridgway et al.
2008/0185830 A1    8/2008 Ridgway et al.

FOREIGN PATENT DOCUMENTS
EP    1 955 923 A2    8/2008
JP    A-2006-62434    3/2006

OTHER PUBLICATIONS
Dec. 29, 2011 extended European Search Report issued in European Patent Application No. 11158400.9.

*Primary Examiner* — Drew Brown
(74) *Attorney, Agent, or Firm* — Oliff & Berridge, PLC

(57) ABSTRACT

A steering device has a guide rail and a holding rubber. The guide rail is mounted on a mounting stay of a vehicle by way of an upper bracket, and the holding rubber restricts movement of the guide rail relative to the upper bracket. The guide rail has a fixed portion and a main body portion extending forward of the vehicle along the axial direction of a steering shaft from the fixed portion. The main body portion is inserted into a through hole of a vehicle body bracket. The holding rubber has a positioning protrusion and a detent pawl for restricting movement of the guide rail relative to the upper bracket before being fixed to the mounting stay so as to hold them at a mounting position. The detent pawl is formed so as to reduce a restricting force for restricting movement of the guide rail relative to the upper bracket as the guide rail comes closer to the mounting stay by screwing a nut onto a bolt.

7 Claims, 9 Drawing Sheets

STEERING DEVICE

CROSS-REFERENCE TO RELATED APPLICATIONS

This application is based upon and claims the benefit of priority from prior Japanese Patent Application No. 2010-644419, filed on Mar. 19, 2010, the entire contents of which are incorporated herein by reference.

BACKGROUND OF THE INVENTION

The present invention relates to a steering device for a vehicle.

Conventionally, some steering devices for vehicles are provided with a steering column that can be detached from the vehicle main body. The steering column supports a steering shaft rotatably. The purpose of such steering devices lies in relaxation of impact, for example, when a vehicle front end collision occurs and the driver collides against the steering wheel (secondary collision) due to the action of inertia. Usually, in this kind of steering device, a fixed bracket for supporting the steering column is configured as a break-away bracket. When a load of not less than a predetermined load acts on the fixed bracket in the vehicle forward direction, the fixed bracket detaches from the vehicle main body. See, for example, Japanese Laid-Open Patent Publication No. 2006-62434.

However, the conventional steering device is configured such that, after the fixed bracket detaches from the vehicle main body, the steering column is no longer supported on the vehicle main body by the fixed bracket. As a result, the steering column (steering wheel) may fall off.

SUMMARY OF THE INVENTION

It is hence an objective of the present invention to provide a steering device capable of maintaining a state of supporting the steering column on the vehicle main body even after the fixed bracket detaches.

To achieve the objective, and in accordance with a first aspect of the present invention, a steering device for a vehicle is provided that includes a steering shaft having an axis, a steering wheel coupled to the steering shaft, a steering column, a fixed bracket, a through hole, a guide rail, and a restricting portion. The steering column rotatably supports the steering shaft. The fixed bracket is fixed to a vehicle main body by way of a fastening device to support the steering column. The fixed bracket is arranged to be detached in the vehicle forward direction when a load of not less than a predetermined load acts in the vehicle forward direction. The through hole is formed through the fixed bracket along the axial direction of the steering column. The guide rail moves the detached fixed bracket along the axial direction of the steering column. The restricting portion restricts movement of the guide rail relative to the fixed bracket. The guide rail has a fixed portion and a main body portion. The fixed portion is fixed to the vehicle main body by way of the fastening device. The main body portion extends along the axial direction of the steering column and is inserted into the through hole. The main body portion is provided to approach the vehicle main body through a fastening operation of the fastening device for fixing the fixed portion to the vehicle main body. The restricting portion has a restricting member for restricting movement of the guide rail relative to the fixed bracket before the guide rail is fixed to the vehicle main body so as to hold the fixed bracket and the guide rail at a mounting position where the fixed bracket and the guide rail can be fixed to the vehicle main body. The restricting member is formed such that its restricting force for restricting movement of the guide rail relative to the fixed bracket becomes smaller as the guide rail approaches the vehicle main body by the fastening operation of the fastening device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A steering device according to one embodiment of the invention will be described below with reference to the accompanying drawings. In the following description, the forward, backward, lateral, and up-and-down directions of the steering device are defined on the basis of the travel direction of the vehicle.

Figure 1:
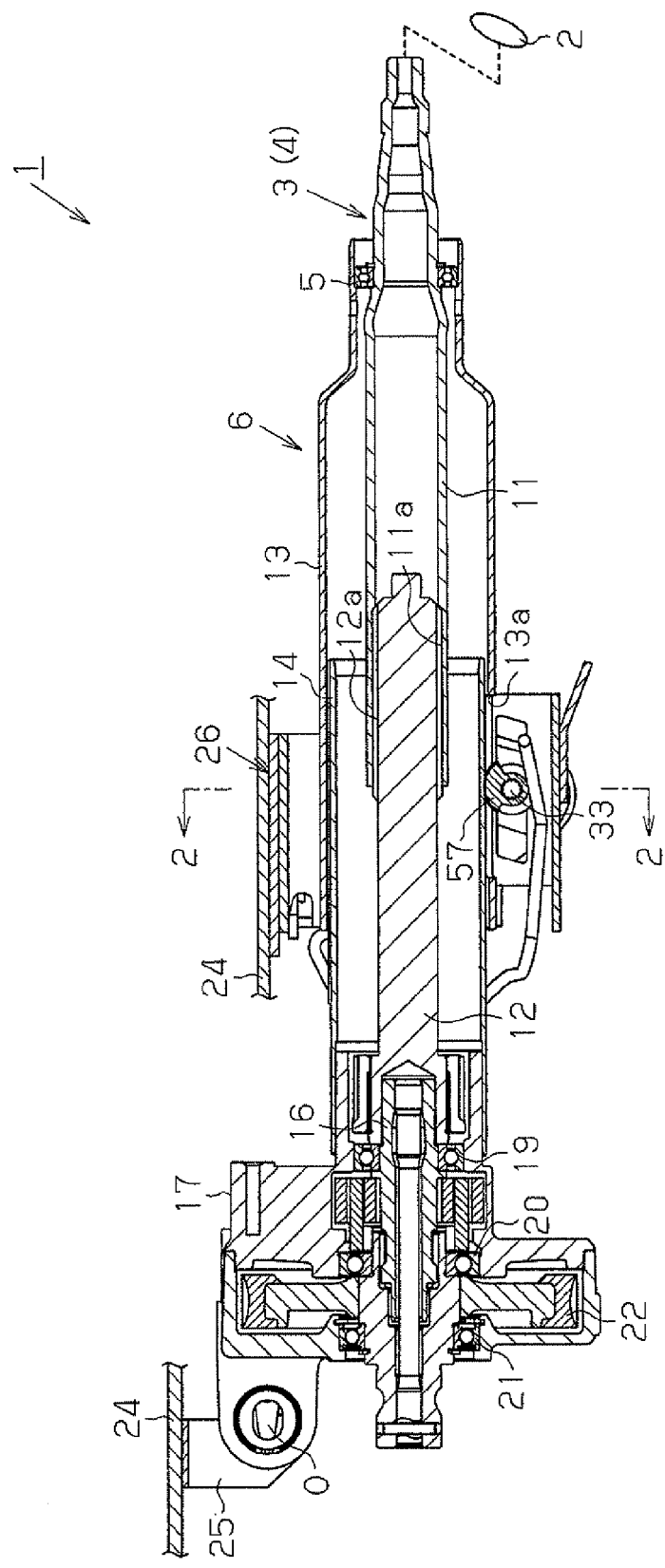
FIG. 1 is a cross-sectional view taken along an axial direction of a steering column in a steering device.

As shown in FIG. 1, a steering device 1 includes a column shaft 4, which is a part of a steering shaft 3, and a steering wheel 2 fixed to a rear end of the steering shaft 3, that is, at the right end in FIG. 1. The column shaft 4 is supported by a bearing 5 to be rotatably accommodated in a steering column 6. A front end of the column shaft 4, that is, the left end in FIG. 1 is coupled to an intermediate shaft (not shown) by way of a universal joint. Hence, the rotating and steering torque caused by steering operations is transmitted to a steering mechanism (not shown) such as rack and pinion mechanism for changing the steering angle of steerable wheels. The steering shaft 3 is mounted on a vehicle in a state inclined so as to be positioned at a lower position toward the front end.

The steering device 1 also includes a tilt adjustment function capable of adjusting the position (steering position) of the steering wheel 2 in the vertical direction, and a telescopic adjusting function capable of adjusting the steering position in the axial direction of the steering shaft 3.

More specifically, the column shaft 4 of this embodiment includes a hollow upper shaft 11 to which the steering wheel 2 is fixed, and a lower shaft 12 that is accommodated in the upper shaft 11. A spline-fitting portion 11a is formed in an inner circumferential surface of the upper shaft 11, and a spline-fitting portion 12a is formed in an outer circumferential surface of the lower shaft 12. The upper shaft 11 and the lower shaft 12 are coupled so as to be relatively slidable along the axial direction of the steering shaft 3 and integrally rotatable by engagement between the spline-fitting portions 11a, 12a. The steering column 6 has an outer tube 13 for accommodating and supporting the upper shaft 11 by way of the bearing 5, and an inner tube 14 for accommodating the lower shaft 12. The inner tube 14 is inserted inside of the outer tube 13. This allows the outer tube 13 to slide along the axial direction of the steering shaft 3 relative to the inner tube 14.

In this embodiment, a housing 17 is provided at the lower end of the inner tube 14. The housing 17 accommodates an output shaft 16 of an EPS (electric power steering) actuator (not shown) for applying to the steering system assist force for assisting steering operations. The output shaft 16 is coupled to the lower end of the lower shaft 12, and is rotatably supported in the housing 17 by means of bearings 19 to 21. The output shaft 16 constitutes the column shaft 4 together with the upper shaft 11 and the lower shaft 12. A worm wheel 22 is fixed to the output shaft 16. Rotation of a motor (not shown) is transmitted to the output shaft 16 by way of a transmission mechanism constituted of the worm wheel 22 and a worm gear (not shown), so that assist force can be applied to the steering system.

The steering column 6 is supported by a lower bracket 25 fixed at the front side of a mounting stay 24, which is a part of the vehicle main body. As a result, the steering column 6 becomes tiltable about a tilt center shaft O provided in the housing 17. The steering column 6 is also supported by an upper bracket 26 fixed at the rear side of the mounting stay 24. This allows the outer tube 13 to be tilted about the tilt center shaft O, and to be moved along the axial direction of the steering shaft 3.

Figure 2:
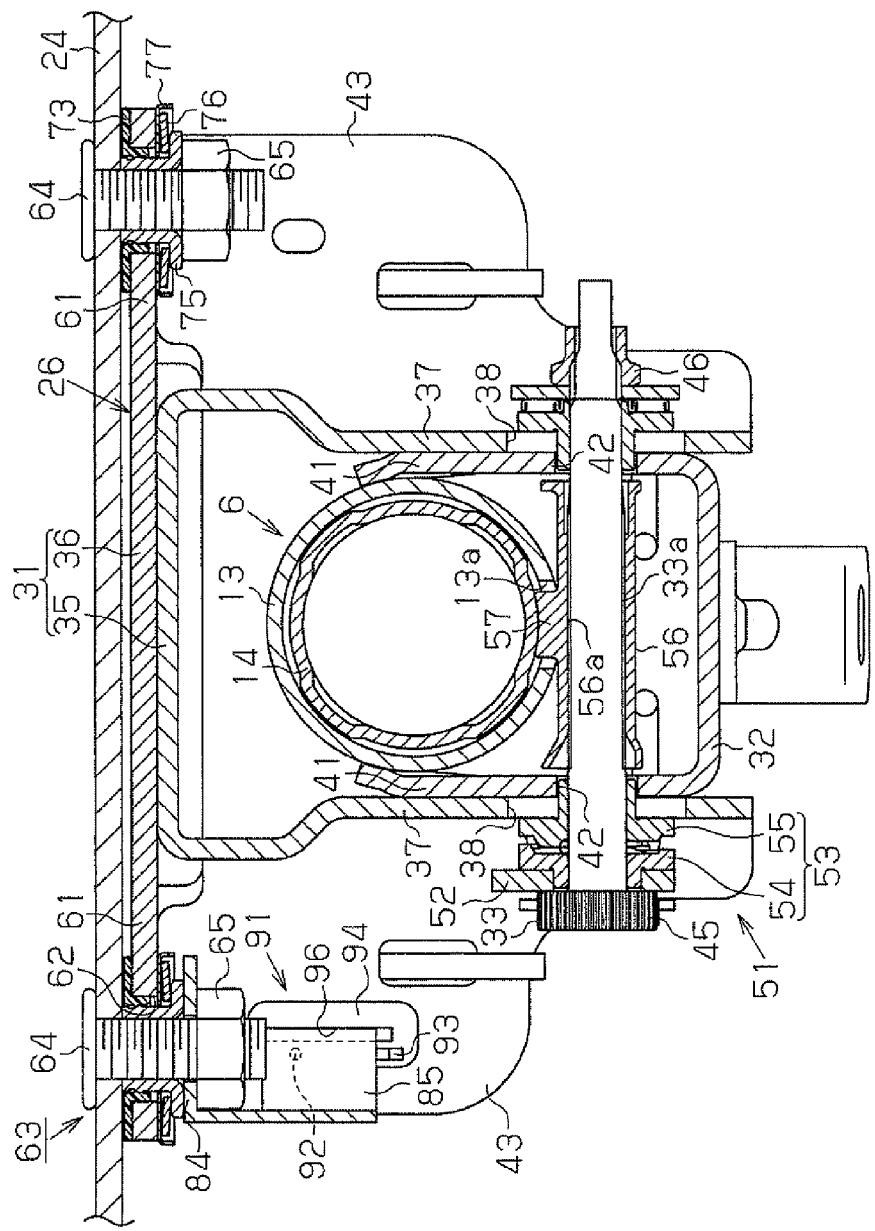
FIG. 2 is a cross-sectional view taken along line 2-2 in FIG. 1.
Figure 3:
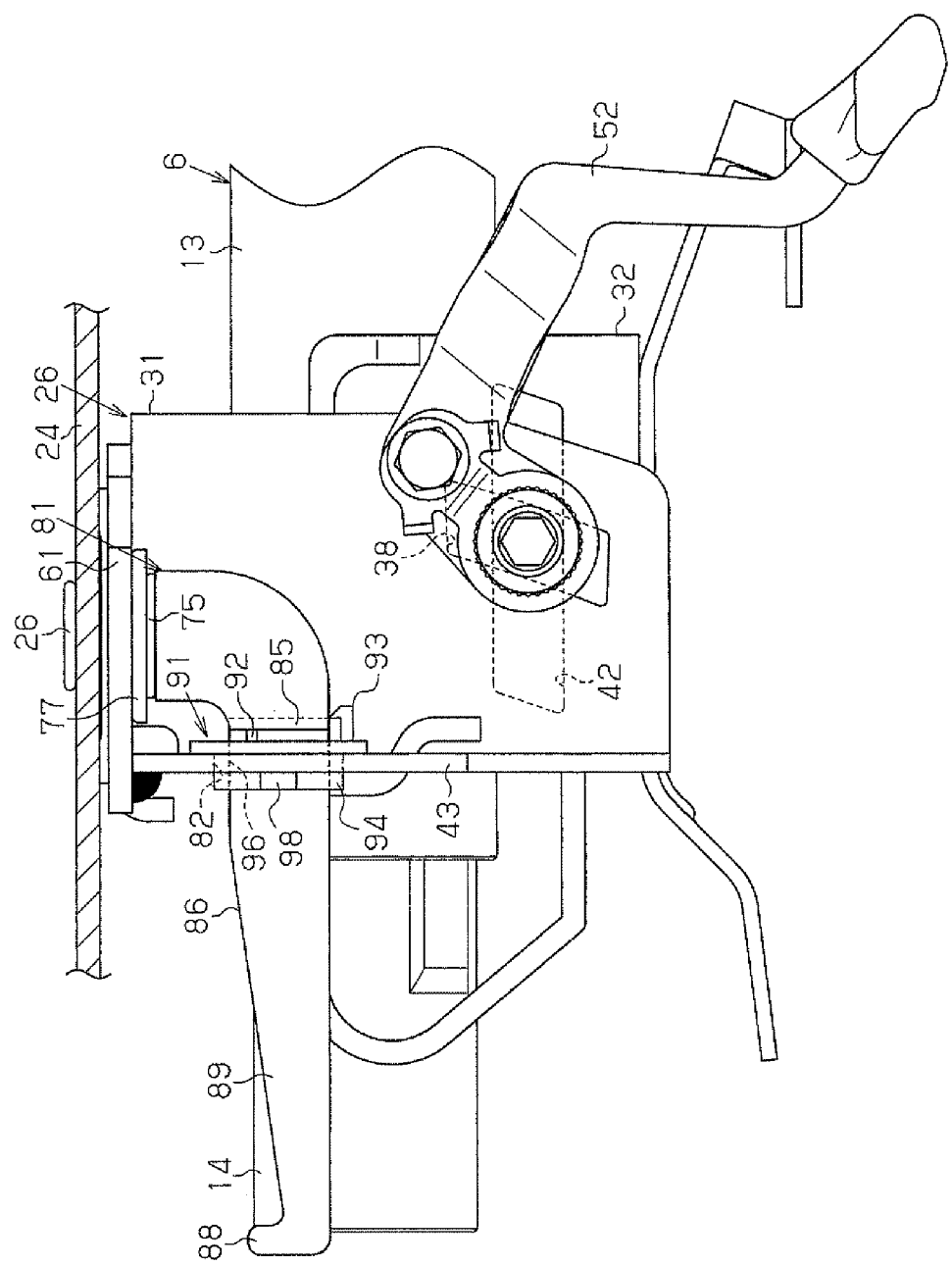
FIG. 3 is a side view showing the steering device.

As shown in FIGS. 2 and 3, the upper bracket 26 includes a vehicle body bracket 31 fixed to the mounting stay 24, a column bracket 32 on which the steering column 6 (outer tube 13) is fixed, and a support shaft 33 for coupling between the vehicle body bracket 31 and the column bracket 32.

The vehicle body bracket 31 is constituted of a clamp portion 35 formed in a substantially U-shape as seen from the axial direction of the steering shaft 3, and a tabular plate portion 36 fixed to the upper end of the clamp portion 35. A pair of side plates 37 provided in the clamp portion 35 is individually provided with substantially arcuate tilt slots 38 along the tilt direction of the steering column 6. The column bracket 32 is formed in a substantially U-shape as seen from the axial direction of the steering shaft 3. A pair of side plates 41 provided in the column bracket 32 is individually provided with telescopic slots 42 extending along the axial direction of the steering shaft 3. The vehicle body bracket 31 of the embodiment is provided with reinforcing portions 43, in order to assure rigidity, at both sides in the lateral direction of the side plates 41 (in the lateral direction in FIG. 2). Each reinforcing portion 43 extends to cross orthogonally with the axial direction of the steering shaft 3.

The support shaft 33 is formed like a shaft. The proximal end of the support shaft 33, that is, the left side in FIG. 2 is provided with a disk-like head 45 extending outward in the radial direction. The support shaft 33 is inserted into the tilt slots 38 and the telescopic slots 42 formed respectively in the both brackets 31, 32 in a state where the column bracket 32 is disposed inside of the vehicle body bracket 31. Consequently, the support shaft 33 couples the vehicle body bracket 31 and the column bracket 32 to each other. A nut 46 is screwed onto the front end of the support shaft 33, that is, the right side in FIG. 2. The support shaft 33 is fixed to the both brackets 31, 32, so as not to be movable in the axial direction of the support shaft 33. This enables the column bracket 32 to be tilted about the tilt center shaft O with respect to the vehicle body bracket 31 in a range of the length of the tilt slots 38. At the same time, the column bracket 32 is movable along the axial direction of the steering shaft 3 in a range of the length of the telescopic slots 42. That is, the upper bracket 26 supports the steering column 6 tiltably and movably along the axial direction in a range of the length of the slots 38, 42.

The steering device 1 further has a lock mechanism 51 for holding the steering position in the vertical direction and the axial direction.

More specifically, the lock mechanism 51 has an operation lever 52 and a cam mechanism 53. The operation lever 52 is rotatable about the support shaft 33 integrally with the support shaft 33. The cam mechanism 53 is disposed between the head 45 of the support shaft 33 and the side plate 37 of the clamp portion 35, to press the side plate 37 to the front end in the axial direction of the support shaft 33, that is, to the left side in FIG. 3, depending on the rotating position of the operation lever 52 (support shaft 33). The cam mechanism 53 includes a first cam member 54 that rotates integrally with the support shaft 33, and a second cam member 55 rotatable relative to the first cam member 54. In the cam mechanism 53, the first cam member 54 and the second cam member 55 contact or separate from each other depending on their relative rotating positions.

The lock mechanism 51 has a tubular pressing member 56. The pressing member 56 presses the inner tube 14 upward in a direction orthogonal to the vehicle widthwise direction and the axial direction of the steering shaft 3 depending on the rotational position of the operation lever 52. A spline-fitting portion 33a is formed in the outer circumferential surface of the support shaft 33, and a spline-fitting portion 56a is formed in an inner circumferential surface of the pressing member 56. The pressing member 56 is coupled to the support shaft 33 so as to rotate integrally with the support shaft 33, by engagement between the spline-fitting portions 33a, 56a. The pressing member 56 has a cam portion 57 of an arcuate section disposed at a position eccentric to the center of the support shaft 33. The cam portion 57 abuts against the inner tube 14 by way of an opening 13a formed in the lower part of the outer tube 13. Depending on the rotational position of the support shaft 33, the cam portion 57 presses the inner tube 14.

By rotating the operation lever 52 in one direction in the circumferential direction, the side plates 37, 41 of the both brackets 31, 32 are frictionally engaged with each other by the cam mechanism 53. The outer circumferential surface of the inner tube 14 and the inner circumferential surface of the outer tube 13 are frictionally engaged with each other by the pressing member 56. In consequence, the column bracket 32 cannot be moved relative to the vehicle body bracket 31, and is set in a locked state incapable of changing the steering position. By contrast, by rotating the operation lever 52 in the other direction of the circumferential direction, the pressing force by the cam mechanism 53 is lost, thereby canceling the frictional engagement of the both brackets 31, 32 by the side plates 37, 41. Accordingly, the pressing force by the pressing member 56 is lost, thereby canceling the frictional engagement of the inner tube 14 and the outer tube 13. Hence, the column bracket 32 is movable relative to the vehicle body bracket 31, and is set in an unlocked state capable of changing the steering position.

In the steering device 1 having such a configuration, when the lock mechanism 51 is set in an unlocked state, and the column bracket 32 and the steering column 6 are tilted to the vehicle body bracket 31, the steering position can be adjusted in an up-and-down direction in a range of the length of the tilt slots 38. Moreover, when the outer tube 13 and the upper shaft 11 are moved relative to the inner tube 14 and the lower shaft 12, and the column bracket 32 is moved relative to the vehicle body bracket 31 along the axial direction, the steering position can be adjusted in the axial direction of the steering shaft 3 in a range of the length of the telescopic slots 42.

The upper bracket 26 is configured as a break-away bracket. For example, when a load of not less than a predetermined load acts forwardly on the upper bracket 26 in the event of a secondary collision, the upper bracket 26 is detached from the mounting stay 24, which is a part of the vehicle main body, by the steering column 6. That is, the upper bracket 26 is formed as a fixed bracket in this embodiment.

Figure 4:
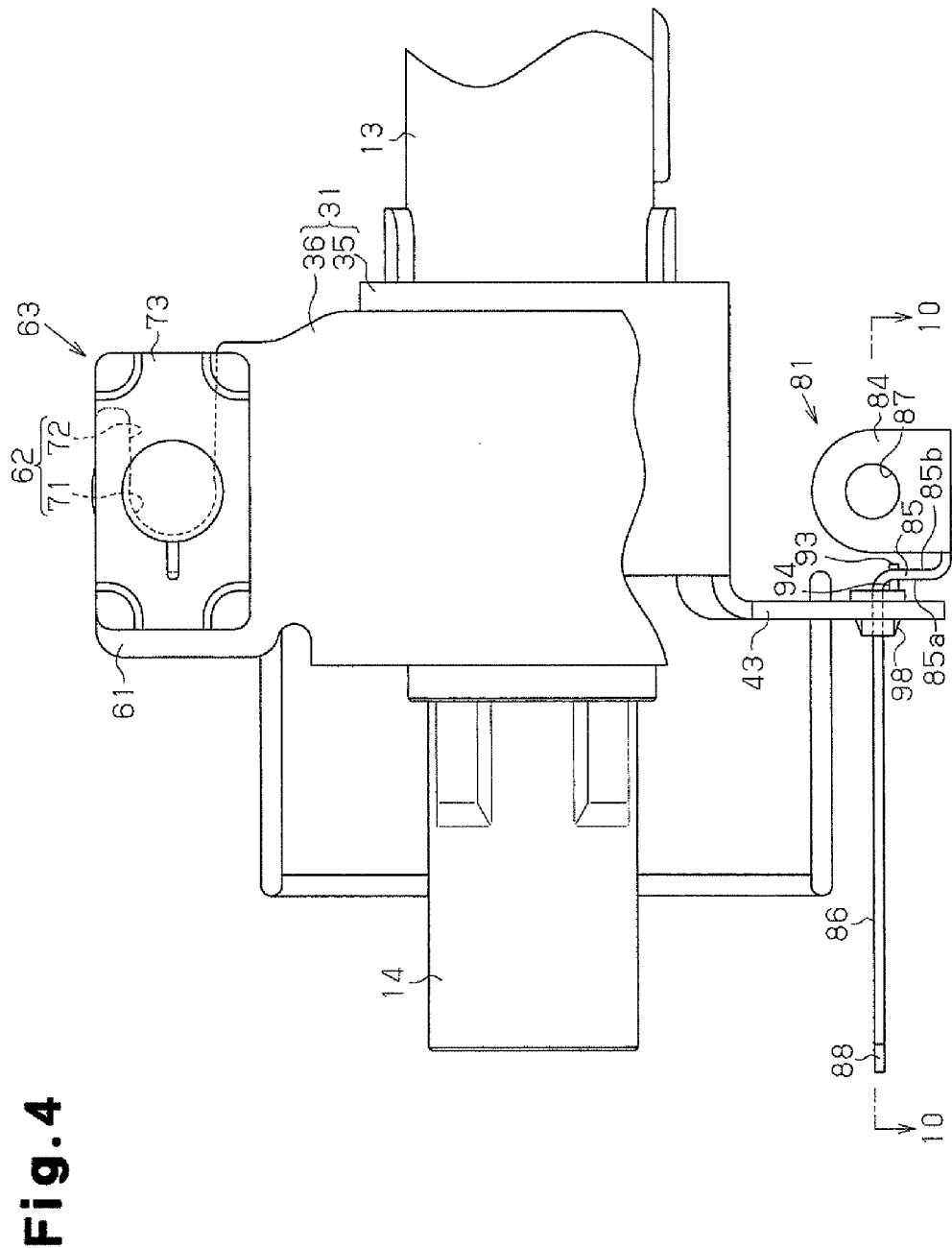
FIG. 4 is a plan view of the steering device showing a partially cut-away view of a vehicle body bracket.
Figure 5:
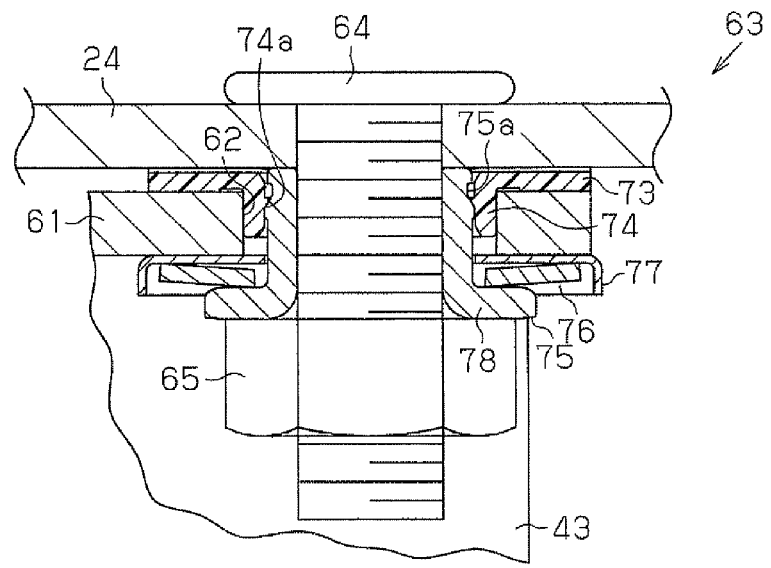
FIG. 5 is an enlarged cross-sectional view showing a capsule mechanism.

More specifically, as shown in FIG. 4, the plate portion 36 of the vehicle body bracket 31 has extending portions 61 extending to both sides in the vehicle widthwise direction (up-and-down direction in FIG. 4) of the clamp portion 35. Each extending portion 61 extends in the axial direction of the steering shaft 3, and is respectively provided with a fastening hole 62 opened at the rear side, that is, at the right side in FIG. 4. As shown in FIG. 5, the upper bracket 26 (vehicle body bracket 31) is fixed to the mounting stay 24. At this time, a bolt 64 projecting from the mounting stay 24 is inserted into each fastening hole 62 by way of a capsule mechanism 63, and a nut 65 is fastened to the bolt 64. That is, a fastening device is composed of a set of bolt 64 and nut 65.

Figure 6:
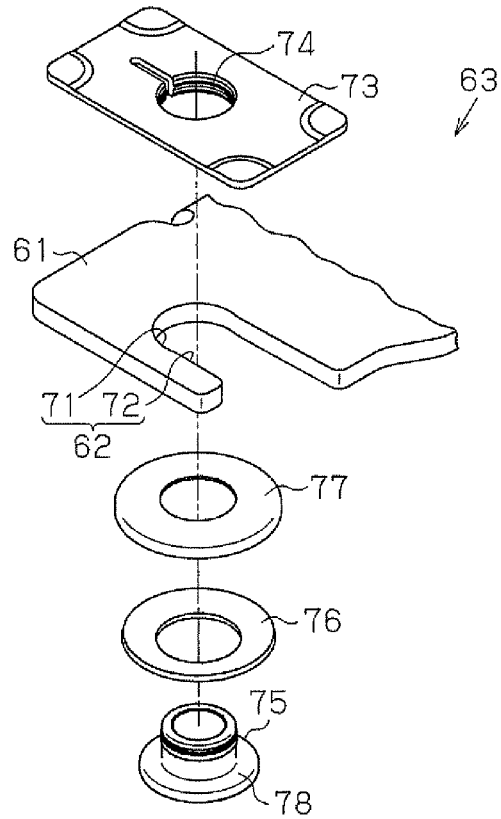
FIG. 6 is an exploded perspective view showing the capsule mechanism in FIG. 5.

As shown in FIGS. 4 and 6, each fastening hole 62 is constituted of a circular portion 71 of a substantially circular shape, and a slit 72 consecutive to the circular portion 71. The slit 72 extends straightly in a constant width smaller than the diameter of the circular portion 71. On the other hand, as shown in FIGS. 5 and 6, the capsule mechanism 63 has a tabular capsule 73 interposed between the upper bracket 26 (the plate portion 36) and the mounting stay 24. The capsule 73 is provided with a tubular boss 74 to be inserted into the circular portion 71 of the fastening hole 62. The outside diameter of the boss 74 is substantially equal to the inside diameter of the circular portion 71, and is larger than the width of the slit 72. The capsule mechanism 63 has a tubular collar 75, a ring-shaped cone disc spring 76 to be externally fitted to the collar 75, and a ring-shaped housing 77 for accommodating the cone disc spring 76. The collar 75 is fitted to the inner circumferential surface of the boss 74. The bolt 64 is inserted into the collar 75. At the lower end of the collar 75, formed is a ring-shaped flange 78 extending to the outer side in the radial direction. The end of the cone disc spring 76 abuts against the flange 78. In the capsule mechanism 63, the nut 65 is screwed onto the front end of the bolt 64, so that the cone disc spring 76 is fixed to the mounting stay 24 in an elastically deformed state. When the upper bracket 26 is detached by urging force of the cone disc spring 76, a frictional force depending on the urging force acts on and among the capsule 73, the plate portion 36, and the mounting stay 24. This frictional force is defined by the urging force of the cone disc spring 76. In this embodiment, the cone disc spring 76 corresponds to an urging member.

In the meantime, an engaging protrusion 74a protruding inward in the radial direction is formed in the inner circumferential surface of the boss 74. At the upper end of the collar 75, an engaging groove 75a is formed to be engaged by the engaging protrusion 74a. By engaging the engaging protrusion 74a of the boss 74 with the engaging groove 75a of the collar 75, the capsule mechanism 63 before being assembled in the vehicle is fixed on the upper bracket 26. This configuration prevents the capsule mechanism 63 from falling off when moving the steering device 1 in a state before assembly into the vehicle.

When a load of not less than a predetermined load acts forwardly on the upper bracket 26, the upper bracket 26 is detached in the axial direction of the steering shaft 3 while the capsule mechanism 63 is left on the vehicle main body. The predetermined load is a load necessary for moving the upper bracket 26, by overcoming the resistance when the boss 74 of the capsule 73 passes through the slit 72 of the fastening hole 62, and the frictional force between the upper bracket 26 and the capsule 73 depending on the urging force of the cone disc spring 76.

After the upper bracket 26 is detached from the mounting stay 24, which is a part of the vehicle main body, the steering column 6 is no longer supported on the mounting stay 24 by the upper bracket 26.

Therefore, as shown in FIGS. 2 to 4 and 7, the steering device 1 of the embodiment is provided with a guide rail 81 for maintaining a state of the upper bracket 26 supported on the mounting stay 24 even after the upper bracket 26 is detached.

Figure 7:
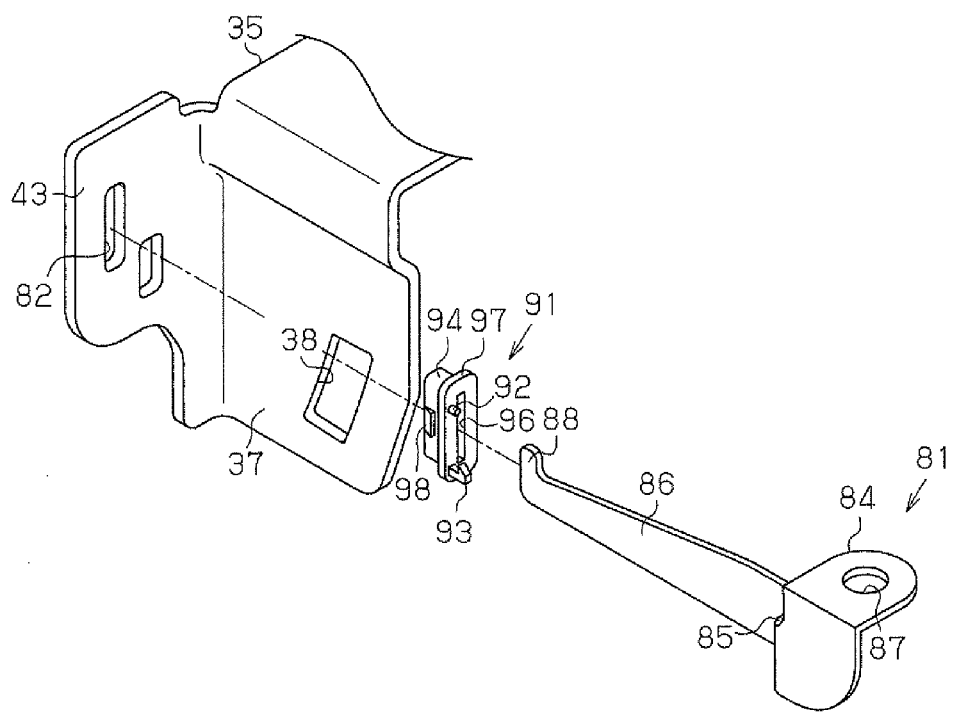
FIG. 7 is an exploded perspective view showing a guide rail, a holding rubber, and the vehicle body bracket.

More specifically as shown in FIGS. 2 and 7, one reinforcing portion 43 of the vehicle body bracket 31 has a through hole 82 extending along the axial direction of the steering shaft 3. The through hole 82 has a rectangular shape extending along the up-and-down direction.

Figure 8A:
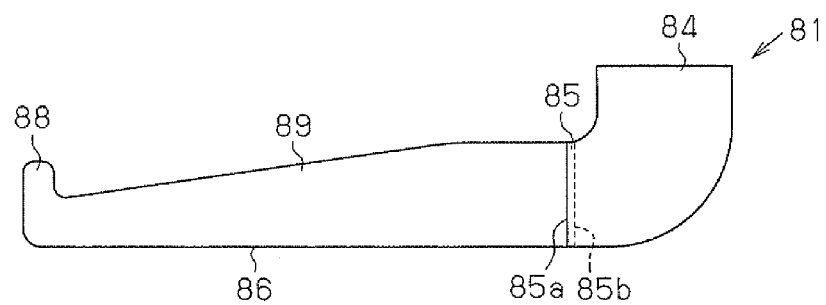
FIG. 8(a) A is a side view showing the guide rail.
Figure 8B:
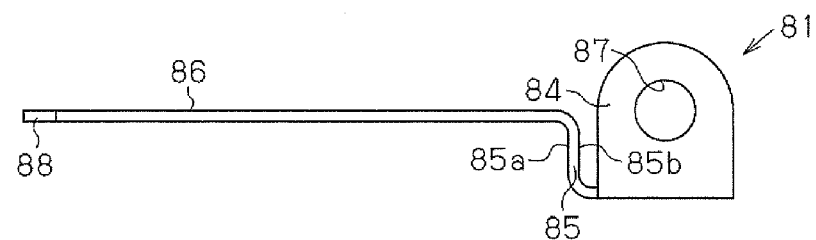
FIG. 8(b) is a plan view showing the guide rail.

As shown in FIGS. 2 to 4, 8(*a*) and 8(*b*), the guide rail 81 has a fixed portion 84 fixed to the mounting stay 24, a side plate portion 85 extending in parallel to the vehicle widthwise direction (up-and-down direction in FIG. 8(*b*)), and a main body portion 86 extending in parallel to the axial direction of the steering shaft 3 (lateral direction in FIG. 8).

Specifically, the fixed portion 84 is formed in a flat plate extending in a direction orthogonal to the up-and-down direction. The fixed portion 84 has a bolt hole 87 for receiving the bolt 64. Since the bolt hole 87 is disposed coaxially with the circular portion 71 of the fastening hole 62, the fixed portion 84 is fixed to the mounting stay 24 integrally with the capsule mechanism 63. Accordingly, when screwing the nut 65 onto the bolt 64, the cone disc spring 76 is compressed, so that the guide rail 81 comes closer to the mounting stay 24, which is a part of the vehicle main body. The side plate portion 85 is formed like a flat plate that extends downward from the left end of the fixed portion 84 and further extends in parallel to the up-and-down direction and along the vehicle widthwise direction.

Moreover, the main body portion 86 is formed like a flat plate that extends along the axial direction of the steering shaft 3 in parallel to the up-and-down direction from the right end of the side plate portion 85. The main body portion 86 is formed so as to be inserted in the through hole 82 in a state where the bolt 64 is inserted in the fixed portion 84. A hook 88 for locking the detached upper bracket 26 is provided at the front end of the main body portion 86. More specifically, the upper end 89 of the main body portion 86 is inclined downward in a forward direction. The main body portion 86 is formed so that its length in the up-and-down direction becomes shorter toward the front end in the axial direction of the steering shaft 3. The hook 88 projects upward from the front end of the main body portion 86.

After the steering device 1 is manufactured and before it is assembled in the vehicle (mounting stay 24), a vibration is applied when moving (transferring) the steering device 1, so that the relative position of the guide rail 81 to the upper bracket 26 may be displaced. To solve this problem, it has been proposed to adjust the relative position of the guide rail 81 to the upper bracket 26 before being fixed to the mounting stay 24 to a mounting position where the upper bracket 26 and the guide rail 81 can be fixed to the mounting stay 24. In spite of such a countermeasure, however, when assembling the steering device 1 in the mounting stay 24, their relative positions must be adjusted again, and the ease of assembly may be lowered. On the other hand, when movement of the guide rail 81 relative to the upper bracket 26 is restricted, the detaching load of the upper bracket 26 being detached from the mounting stay 24 varies depending on its restricting force. Accordingly, it is desired to, after the steering device 1 is assembled in the vehicle, reduce the restricting force for restricting movement of the guide rail 81 relative to the upper bracket 26, and suppress the effects on the detaching load of the upper bracket 26.

In this regard, as shown in FIGS. 2 to 4, 7, 9(*a*) and 9(*b*), the steering device 1 of the embodiment is provided with a holding rubber 91 that is fixed to the vehicle body bracket 31 and serves as a restricting portion for restricting movement of the guide rail 81 relative to the upper bracket 26. The holding rubber 91 has a positioning protrusion 92 as a positioning portion abutting against the front surface 85*a* of the side plate portion 85, and a detent pawl 93 as a detent part for locking the rear surface 85*b* of the side plate portion 85 in a state before assembling of the steering device 1. The holding rubber 91 also has a buffer portion 94 as a buffer member to be installed in the through hole 82. The buffer portion 94 has a loose insertion hole 96 for allowing loose insertion of the main body portion 86. In this embodiment, the positioning protrusion 92, the detent pawl 93, and the buffer portion 94 are made of elastic materials such as synthetic rubber or resin material. The buffer portion 94 is formed integrally with the positioning protrusion 92 and the detent pawl 93. The restricting member is constituted of the positioning protrusion 92 and the detent pawl 93.

In a state before fixing the upper bracket 26 and the guide rail 81 to the mounting stay 24, the holding rubber 91 holds the guide rail 81 at a mounting position where the upper bracket 26 and the guide rail 81 can be fixed to the mounting stay 24, that is, at a position where the bolt hole 87 of the fixed portion 84 is disposed coaxially with the circular portion 71 of the fastening hole 62. In the holding rubber 91, as the guide rail 81 comes closer to the mounting stay 24 by screwing the nut 65 onto the bolt 64, the restricting force for restricting movement of the guide rail 81 relative to the upper bracket 26 becomes smaller.

More specifically, the holding rubber 91 is fixed to the vehicle body bracket 31 as the buffer portion 94 is inserted in the through hole 82. The buffer portion 94 is formed like a substantially rectangular parallelepiped corresponding to the shape of the through hole 82. At the rear end of the buffer portion 94, a flange 97 is formed to extend to the outer side from the outer circumferential surface. At the front end of the buffer portion 94, a protrusion 98 is formed to protrude in the lateral direction. When the holding rubber 91 is inserted into the through hole 82, its protrusion 98 is hooked to the front surface of the reinforcing portion 43. As a result, the holding rubber 91 is fixed to the upper bracket 26 (see FIG. 4). The loose insertion hole 96 is formed to extend through substantially the center of the buffer portion 94 along the axial direction of the steering shaft 3. The main body portion 86 of the guide rail 81 is inserted in the through hole 82 by way of the loose insertion hole 96. The length of the loose insertion hole 96 in the up-and-down direction is set longer than the up-and-down direction length of the rear end in the main body portion 86 by not less than the compression amount of the cone disc spring 76 compressed when assembling the steering device 1.

Figure 9A:
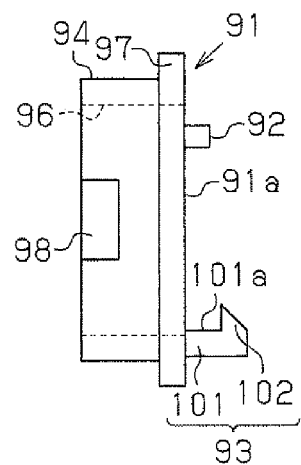
FIG. 9(a) is a side view showing the holding rubber.
Figure 9B:
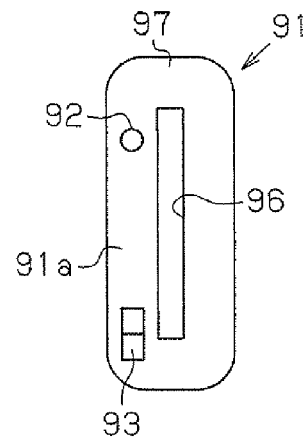
FIG. 9(b) is a front view showing the holding rubber.

As shown in FIGS. 9(*a*) and 9(*b*), the positioning protrusion 92 is formed in a substantially columnar shape, protruding backward (to the right side in FIG. 9(*a*)) from the buffer portion 94. The positioning protrusion 92 is disposed in an upper part of a surface 91*a* of the holding rubber 91 (the buffer portion 94) opposite to the front surface 85*a* of the side plate portion 85. The protruding amount of the positioning protrusion 92 is determined so that the bolt hole 87 of the fixed portion 84 may be disposed coaxially with the circular portion 71 of the fastening hole 62, in a state where the main body portion 86 of the guide rail 81 is loosely inserted in the loose insertion hole 96 and where the positioning protrusion 92 contacts the front surface 85*a* of the side plate portion 85.

On the other hand, the detent pawl 93 is constituted of a linkage portion 101 formed in a substantially square columnar shape projecting backward from the buffer portion 94, and a pawl portion 102 protruding upward from the rear end of the linkage portion 101. In a state where the front surface 85*a* of the side plate portion 85 abuts against the positioning protrusion 92 and the lower end of the main body portion 86 abuts against the lower end of the loose insertion hole 96, the pawl portion 102 is hooked to the rear surface 85*b* of the side plate portion 85 to hold a relative position of the guide rail 81 to the upper bracket 26 (see FIG. 12). More specifically, the pawl portion 102 is in contact with the side plate portion 85 pressed forward, and a frictional force acts on and among the positioning protrusion 92, the detent pawl 93, and the side plate portion 85. As a result, the position of the guide rail 81 in the up-and-down direction is held. Moreover, as the detent pawl 93 is hooked to the rear surface 85*b* of the side plate portion 85, the guide rail 81 is restricted from being moved relative to the upper bracket 26 in the axial direction of the steering shaft 3.

Figure 10:
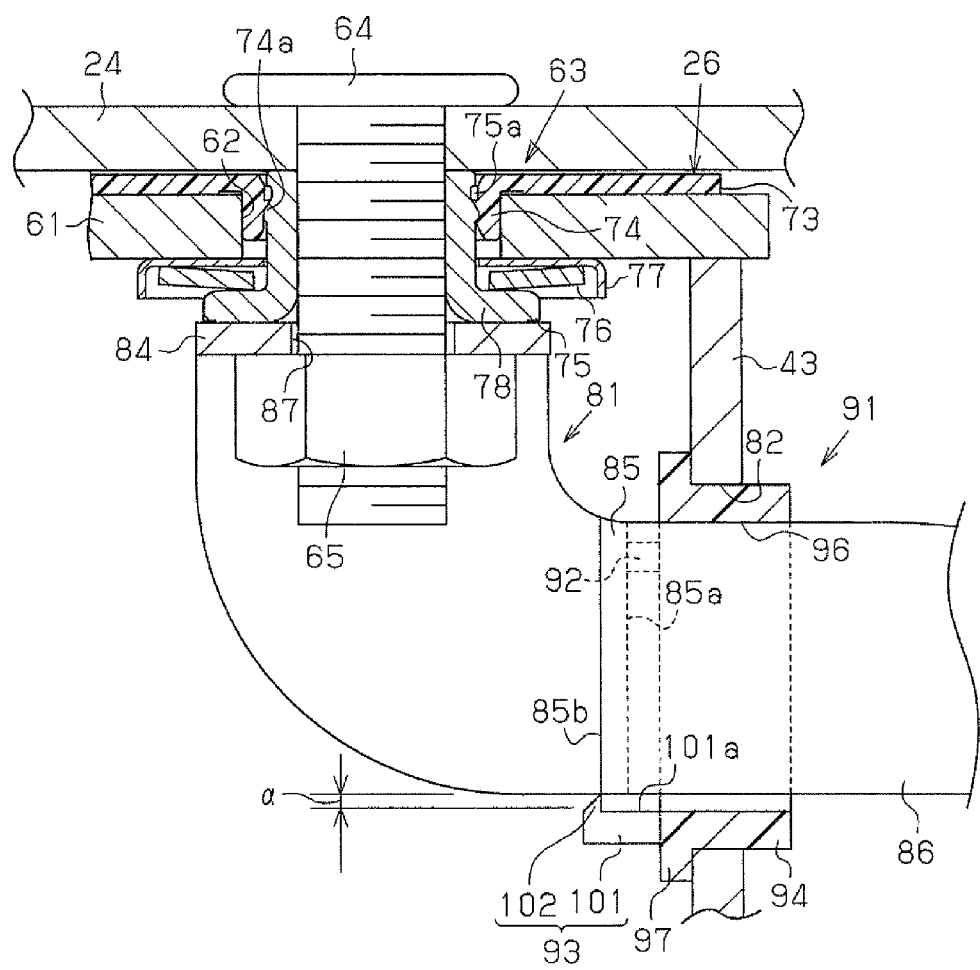
FIG. 10 is a cross-sectional view taken along line 10-10 in FIG. 4.

Further, the detent pawl 93 is formed at a position where the upper side 101*a* of the linkage portion 101 abuts against the lower end of the side plate portion 85, with the lower end of the main body portion 86 in contact with the lower end of the loose insertion hole 96. The pawl portion 102 of the detent pawl 93 is formed to protrude upward from the lower end of the side plate portion 85. In other words, in the pawl portion 102 of the detent pawl 93, the contact area between the rear surface 85*b* and the pawl portion 102 becomes smaller when the guide rail 81 moves upward to approach the mounting stay 24. In the embodiment, the protruding amount α of the pawl portion 102 is not larger than the compression amount β (see FIG. 12) of the cone disc spring 76 as the nut 65 is screwed onto the bolt 64. As shown in FIG. 10, the lower end of the side plate portion 85 is positioned higher than the upper end of the pawl portion 102, and the contact area between the rear surface 85*b* and the pawl portion 102 is reduced to zero, that is, the rear surface 85*b* and the pawl portion 102 do not contact each other.

Next, operation of the steering device 1 of the embodiment will be described.

Figure 11:
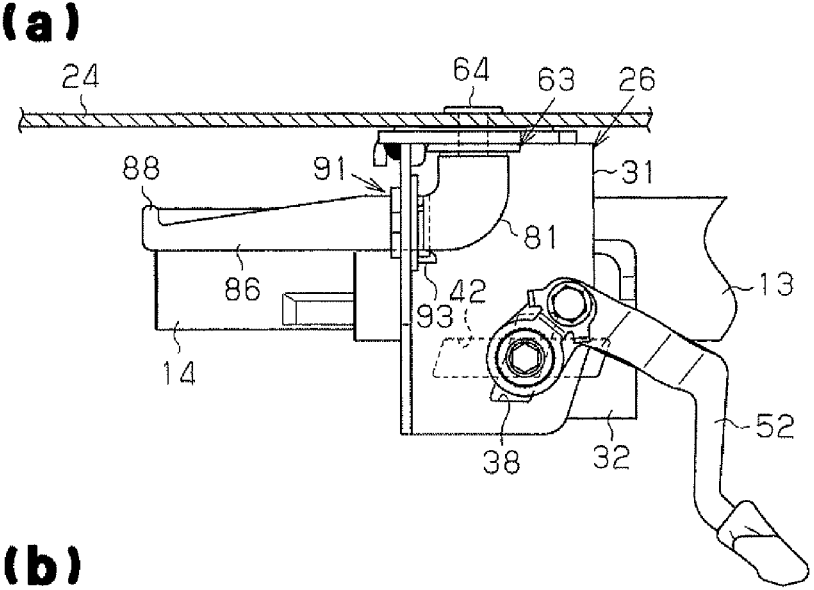
FIGS. 11(a) to 11(c) are explanatory operational views showing a mode of detaching an upper bracket.
Figure 11:
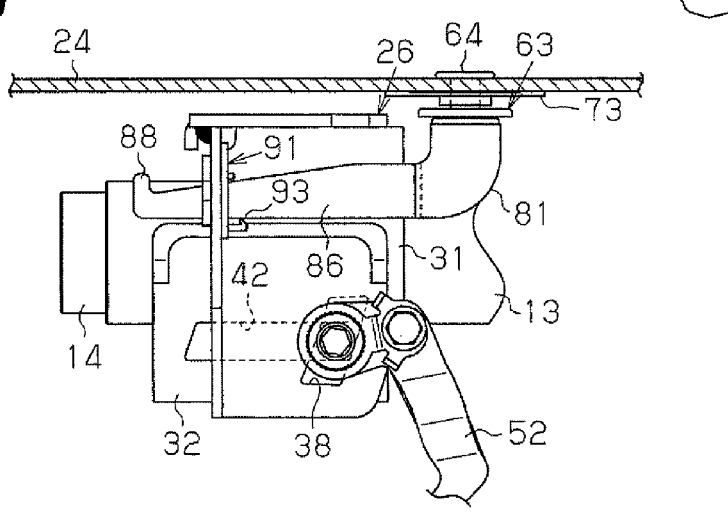
Figure 11:
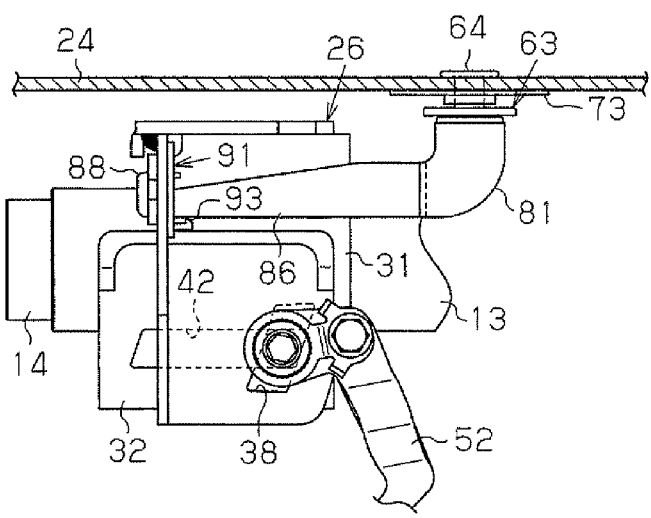

As shown in FIG. 11(*a*), before the upper bracket 26 is detached, the upper bracket 26 is fixed to the mounting stay 24 by way of the capsule mechanism 63, and the steering column 6 (the outer tube 13) is supported on the mounting stay 24 by means of the upper bracket 26. As mentioned above, when a load of not less than a predetermined load amount acts forward on the upper bracket 26, the upper bracket 26 is detached from the mounting stay 24 as shown in FIG. 11(b). Accordingly, in this embodiment, the main body portion 86 of the guide rail 81 is loosely inserted into the loose insertion hole 96 of the holding rubber 91, and the lower end of the side plate portion 85 is positioned higher than the pawl portion 102 of the detent pawl 93. Therefore, the detent pawl 93 is not hooked to the side plate portion 85 (see FIG. 10). Hence, when the upper bracket 26 is detached, the guide rail 81 is not restricted by the holding rubber 91 from being moved relative to the upper bracket 26 in the axial direction of the steering shaft 3. Therefore, the holding rubber 91 has no effect on the detaching load with which the upper bracket 26 is detached from the mounting stay 24. As a result, the predetermined load acts on the upper bracket 26, thereby securely detaching the upper bracket 26.

In this manner, after the upper bracket 26 is detached, the main body portion 86 of the guide rail 81 fixed to the mounting stay 24 is inserted in the through hole 82 of the vehicle body bracket 31 by way of the buffer portion 94, and thus, the upper bracket 26 moves along the longitudinal direction (axial direction). Further, as shown in FIG. 11(c), the upper bracket 26 abuts against the hook 88 of the guide rail 81 to be restricted from moving further forward (left side in FIG. 11(c)). In this manner, since the main body portion 86 of the guide rail 81 fixed to the mounting stay 24 is inserted in the through hole 82 of the upper bracket 26, the upper bracket 26 is supported on the mounting stay 24 by way of the guide rail 81. With this configuration, even after the upper bracket 26 is detached, the steering column 6 remains in a state being supported on the mounting stay 24 by way of the guide rail 81, and the steering column 6 is prevented from falling off.

Even when, for example, the steering column 6 moves backward along the main body portion 86 of the guide rail 81 due to reaction from a secondary collision after the upper bracket 26 has detached, the upper bracket 26 abuts against the capsule mechanism 63, the bolt 64, and the nut 65. This prevents the steering column 6 (the steering wheel 2) from moving backward.

The procedure for assembling the steering device in the main body will be described below.

Figure 12:
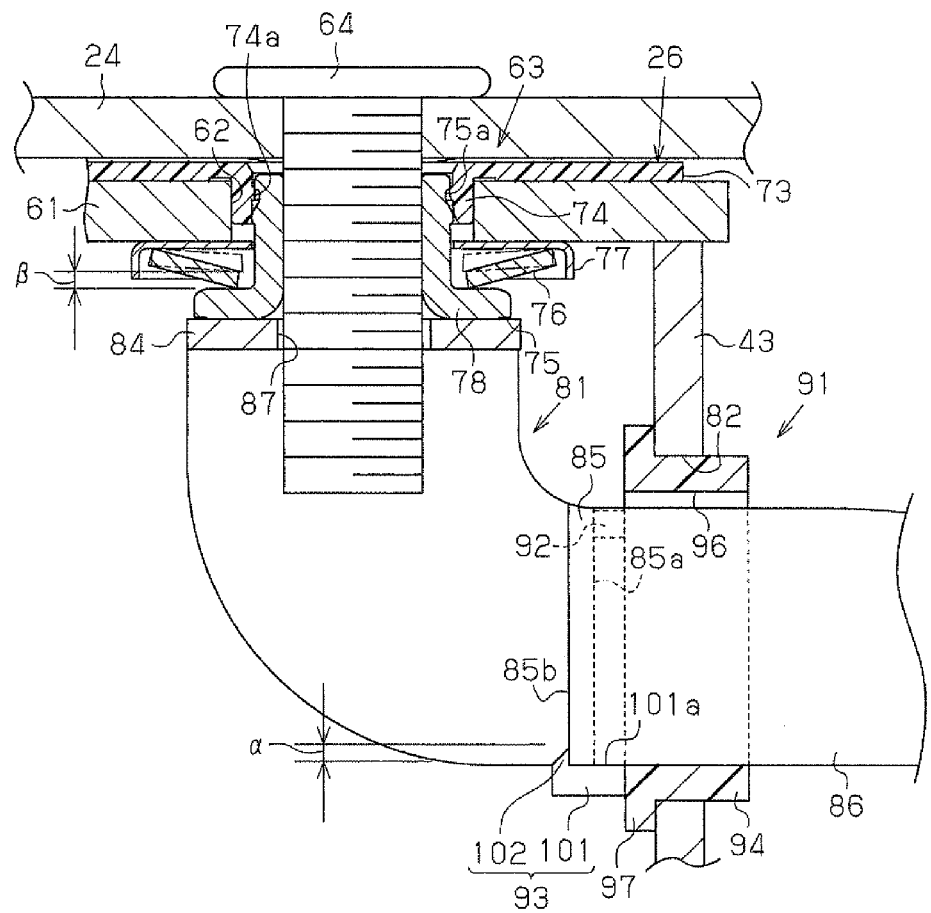
FIG. 12 is a cross-sectional view showing a cross section near the holding rubber before assembly of the steering device.

As shown in FIG. 12, the steering device 1 is manufactured in a state where the detent pawl 93 is hooked to the rear surface 85b of the side plate portion 85. Hence, the relative position of the guide rail 81 to the upper bracket 26 is not displaced by the vibration occurring when moving or transferring the steering device 1, and the relative position of the guide rail 81 to the upper bracket 26 is held at the mounting position. Accordingly, the guide rail 81 moves to approach the mounting stay 24 as the cone disc spring 76 is deformed elastically (compressed) by screwing the nut 65 onto the bolt 64. The moving amount of the guide rail 81 is equal to the compression amount β of the cone disc spring 76. Moreover, the protruding amount α of the pawl portion 102 of the detent pawl 93 is set not larger than the compression amount β of the cone disc spring 76. With this configuration, after the steering device 1 is assembled in the vehicle, the contact area between the pawl portion 102 of the detent pawl 93 and the side plate portion 85 of the guide rail 81 is reduced to zero (see FIG. 10). In this manner, the holding rubber 91 restricts relative movement of the guide rail 81, before assembling of the steering device 1, that is, before fixing of the upper bracket 26 and the guide rail 81 to the mounting stay 24. Moreover, the holding rubber 91 has no effect on the detaching load of the upper bracket 26 after assembling of the steering device 1, that is, after fixing of the upper bracket 26 and the guide rail 81 to the mounting stay 24.

As described specifically herein, this embodiment brings about the following advantages.

(1) The steering device 1 includes the guide rail 81 having the main body portion 86 extending forward from the fixed portion 84 in the axial direction of the steering shaft 3 and inserted into the through hole 82, and the holding rubber 91 for restricting movement of the guide rail 81 relative to the upper bracket 26. The holding rubber 91 is provided with the positioning protrusion 92 and the detent pawl 93 for restricting movement of the guide rail 81 relative to the upper bracket 26 before being fixed to the mounting stay 24 so as to hold them at the mounting position. The detent pawl 93 is formed so as to, by screwing the nut 65 onto the bolt 64, reduce the restricting force for restricting movement of the guide rail 81 relative to the upper bracket 26 as the guide rail 81 is coming closer to the mounting stay 24.

According to this configuration, even if the upper bracket 26 is detached forward from the mounting stay 24 and is moved forward, the main body portion 86 of the guide rail 81 is inserted in its through hole 82, and the upper bracket 26 is supported on the mounting stay 24 by way of the guide rail 81. Therefore, even after the upper bracket 26 is detached, the steering column 6 remains in a state being supported on the mounting stay 24 by way of the guide rail 81, and the steering column 6 is prevented from falling off.

From the viewpoint of ease of assembly of the steering device 1, it is desired to restrict movement of the guide rail 81 relative to the upper bracket 26. From the viewpoint of detaching performance of the upper bracket 26, it is desired to decrease the restricting force for restricting movement of the guide rail 81 relative to the upper bracket 26.

In this respect, according to this configuration, in a state before being fixed on the mounting stay 24, movement of the guide rail 81 relative to the upper bracket 26 is restricted by the holding rubber 91. Accordingly, the relative position of the guide rail 81 on the upper bracket 26 cannot be easily displaced by vibration when moving the steering device 1, thereby suppressing decrease of ease of assembly of the steering device 1. The positioning protrusion 92 and the detent pawl 93 are formed to decrease the restricting force for restricting relative movement of the guide rail 81 as the guide rail 81 comes closer to the mounting stay 24 when assembling the steering device 1 in the vehicle. Accordingly, after assembling of the steering device 1, the restricting force for restricting relative movement of the upper bracket 26 and the guide rail 81 becomes smaller, thereby making it possible to decrease the effect of the holding rubber 91 on the detaching load of the upper bracket 26.

(2) The guide rail 81 is provided with the side plate portion 85 extending along the lateral direction. The holding rubber 91 has the positioning protrusion 92 and the detent pawl 93. When the positioning protrusion 92 contacts the front surface 85a of the side plate portion 85, the guide rail 81 is positioned on the upper bracket 26 in the axial direction of the steering shaft 3. The detent pawl 93 is hooked to the rear surface 85b of the side plate portion 85, and the contact area with the rear surface 85b becomes smaller as the guide rail 81 comes closer to the mounting stay 24. The detent pawl 93 is formed so that the contact area with the rear surface 85b may be zero when the upper bracket 26 and the guide rail 81 are fixed to the mounting stay 24.

According to this configuration, the frictional force of the positioning protrusion 92, the detent pawl 93, and the side plate portion 85 restricts the movement of the guide rail 81 in the direction of approaching the mounting stay 24. Moreover, when the rear surface 85b of the side plate portion 85 is locked by the detent pawl 93, the movement of the guide rail 81 along the axial direction of the steering shaft 3 is restricted. This makes it easy to suppress the decrease of the ease of assembly of the steering device 1. When the guide rail 81 is fixed to the mounting stay 24, the contact area between the rear surface 85b of the side plate portion 85 and the detent pawl 93 is reduced to zero. Accordingly, when detaching the upper bracket 26, the holding rubber 91 has no effect on the detaching load of the upper bracket 26. In addition, when the front surface 85a of the side plate portion 85 abuts against the positioning protrusion 92, the guide rail 81 can be easily positioned on the upper bracket 26 in the axial direction of the steering shaft 3.

(3) The buffer portion 94 is formed integrally with the positioning protrusion 92 and the detent pawl 93. The buffer portion 94 is fitted into the through hole 82, and is made of an elastic material. The buffer portion 94 has the loose insertion hole 96 for loosely inserting the main body portion 86. According to this configuration, since the elastic material is interposed between the main body portion 86 and the through hole 82, it is possible to prevent generation of unusual noise due to contact between the main body portion 86 and the upper bracket 26 by vibration or other effects during driving of the vehicle. In addition, since the main body portion 86 is loosely inserted into the loose insertion hole 96, there is no effect on the detaching load of the upper bracket 26. Moreover, since the buffer portion 94 is formed integrally with the positioning protrusion 92 and the detent pawl 93, increase in the number of component parts can be suppressed.

(4) The upper bracket 26 is provided with the fastening hole 62 opened in a rear part for inserting the bolt 64. The upper bracket 26 is fixed to the mounting stay 24 with the capsule mechanism 63 interposed between the fastening hole 62 and the bolt 64. The capsule mechanism 63 has the capsule 73 abutting against the upper bracket 26, and the cone disc spring 76 compressed by screwing the nut 65 onto the bolt 64. The fixed portion 84 of the guide rail 81 is fixed by the bolt 64 and the nut 65 with the cone disc spring 76 interposed between the fixed part and the mounting stay 24. According to this configuration, since the guide rail 81 is fixed to the mounting stay 24 by means of the bolt 64 and the nut 65 commonly used for fixing the upper bracket 26 on the vehicle main body, increase in the number of component parts is prevented.

The foregoing embodiment may be modified appropriately as described below.

In this embodiment, the pawl portion 102 of the detent pawl 93 entirely contacts and is hooked to the rear surface 85b of the side plate portion 85 before assembly of the steering device 1. When, in this state, the guide rail 81 is fixed on the mounting stay 24, the contact area between the rear surface 85b and the pawl portion 102 is reduced to zero, and the detent pawl 93 is not hooked to the side plate portion 85. However, not limited to this example, even after the guide rail 81 is fixed to the mounting stay 24, a part of the pawl portion 102 may contact and be hooked to the rear surface 85b. In this case, when the upper bracket 26 is detached, it is necessary to move the upper bracket 26 and the guide rail 81 relative to each other by deforming the detent pawl 93 and the guide rail 81. Accordingly, in this configuration, since the contact area between the rear surface 85b and the detent pawl 93 becomes smaller after assembling of the steering device 1, the upper bracket 26 and the guide rail 81 can be moved relative to each other even if the deformation amount of the detent pawl 93 and the guide rail 81 is smaller as compared with the state before assembling of the steering device 1. This results in reduction of the restricting force caused by the holding rubber 91 after assembly of the steering device 1, and also decrease of the effect of the holding rubber 91 on the detaching load of the upper bracket 26.

Figure 13A:
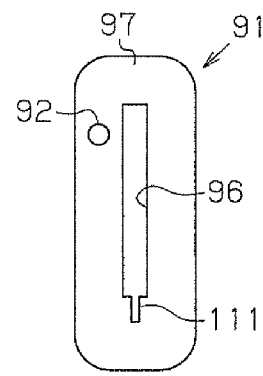
FIG. 13(a) is a front view showing another holding rubber.

In this embodiment, the detent pawl 93 is formed on the holding rubber 91 and the pawl portion 102 is hooked to the side plate portion 85, so that the relative position of the guide rail 81 to the upper bracket 26 is maintained. Instead, the embodiment may be modified, for example, as shown in FIG. 13(a). That is, the detent pawl 93 is omitted. A press-fitting portion 111 is formed as a restricting member at the lower end of the loose insertion hole 96. The lateral width of the press-fitting portion 111 is set smaller than the lateral direction length, that is, the thickness of the main body portion 86. The up-and-down direction length of the press-fitting portion 111 is set smaller than the compression amount β of the cone disc spring 76. The main body portion 86 is press-fitted into the press-fitting portion 111. As a result, before assembling of the steering device 1, the main body portion 86 of the guide rail 81 is held in the press-fitting portion 111, so that the press-fitting portion 111 is locked by the friction against the main body portion 86. Hence, movement of the guide rail 81 relative to the upper bracket 26 is restricted, to thereby suppress lowering of the ease of assembly. Moreover, the up-and-down direction length of the press-fitting portion 111 is set shorter than the compression amount β of the cone disc spring 76. Accordingly, when the upper bracket 26 and the guide rail 81 are fixed to the mounting stay 24, the main body portion 86 moves above the press-fitting portion 111, and locking of the press-fitting portion 111 is canceled. Therefore, when the upper bracket 26 is detached, relative movement of the upper bracket 26 and the guide rail 81 is not restricted by the holding rubber 91, which makes it possible to sufficiently reduce the effect of the holding rubber 91 on the detaching load of the upper bracket 26. In FIG. 13(a), in the meantime, the up-and-down length of the press-fitting portion 111 may be set larger than the compression amount β of the cone disc spring 76.

Figure 13B:
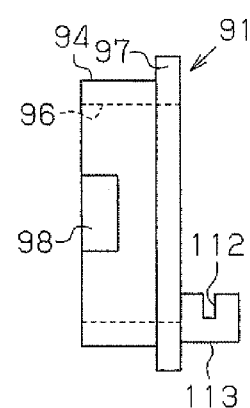
FIG. 13(b) is a side view showing another holding rubber.

Alternatively, as shown in FIG. 13(b), a protruding piece 113 may be formed in the holding rubber 91. The protruding piece 113 protrudes backward from the holding rubber 91. The protruding piece 113 has a groove portion 112 as a restricting member for holding the side plate portion 85 while the lower end of the main body portion 86 is in contact with the lower end of the loose insertion hole 96. The up-and-down direction length of the groove portion 112 is set shorter than the compression amount β of the cone disc spring 76. Moreover, when the side plate portion 85 is press-fitted into the groove portion 112, and the front surface 85a of the side plate portion 85 abuts against of the groove portion 112, the guide rail 81 is positioned on the upper bracket 26 in the axial direction of the steering shaft 3. As a result, the frictional force between the groove portion 112 and the side plate portion 85 restricts the movement of the guide rail 81 in a direction of approaching the mounting stay 24. Further, since the rear surface 85b of the side plate portion 85 is locked behind the groove portion 112, the movement of the guide rail 81 along the axial direction is restricted, to thereby easily suppress lowering of the ease of assembly of the steering device 1. When the guide rail 81 is fixed to the mounting stay 24, the contact area between the side plate portion 85 and the groove portion 112 is reduced to zero. Therefore, when the upper bracket 26 is detached, effect of the holding rubber 91 on the detaching load of the upper bracket 26 can be eliminated. Moreover, in FIG. 13(b), the up-and-down direction length of the groove portion 112 may be set longer than the compression amount β of the cone disc spring 76.

Further, the holding rubber 91 may be provided with an adhesive member such as an adhesive agent or a tacky tape. In this case, the lower end of the guide rail contacts the adhesive member before assembling of the steering device 1. When the guide rail 81 comes closer to the mounting stay 24, the lower end of the guide rail 81 is separated from the adhesive member. Alternatively, as the guide rail 81 comes closer to the mounting stay 24, the restricting force for restricting movement of the guide rail 81 relative to the upper bracket 26 may be decreased, or any other configuration may be employed as far as the same advantages are obtained.

In the foregoing embodiment, as the front surface 85a of the side plate portion 85 abuts against the positioning protrusion 92 of the holding rubber 91, the relative position of the guide rail 81 to the upper bracket 26 is determined as the mounting position. Instead, for example, by causing the front surface 85a of the side plate portion 85 to abut against the surface 91a of the holding rubber 91 without forming the positioning protrusion 92 on the holding rubber 91, the relative position of the guide rail 81 on the upper bracket 26 may be determined as the mounting position. In this case, the surface 91a of the holding rubber 91 functions as the positioning portion.

In the foregoing embodiment, the buffer portion 94, the positioning protrusion 92, and the detent pawl 93 are integrally formed to configure the holding rubber 91. Instead, the buffer portion 94, the positioning protrusion 92, and the detent pawl 93 may be individually composed of different members.

In the foregoing embodiment, the buffer portion 94 is provided in the holding rubber 91. Instead, the buffer portion 94 may be omitted. That is, without forming the buffer portion 94 in the holding rubber 91, only the positioning protrusion 92 and the detent pawl 93 may be formed in the holding rubber 91. In this case, the main body portion 86 is inserted into the through hole 82 directly with sufficient play.

In the foregoing embodiment, the guide rail 81 is fixed to the mounting stay 24 by means of a set of bolt 64 and nut 65 for fixing the upper bracket 26 to the mounting stay 24. Instead, however, when fixing the upper bracket 26 to the mounting stay 24, the guide rail 81 may be fixed on the mounting stay 24 by additionally provided bolt and nut as long as the guide rail 81 is provided closely to the mounting stay 24. In this case, the fastening device is constituted of the bolt 64 and the nut 65, and the additionally provided bolt and nut used for fixing the guide rail 81. In this case, the fixed portion 84 of the guide rail 81 may be disposed at the front side of the upper bracket 26, and the main body portion 86 may extend backward from the fixed portion 84 for insertion into the through hole 82 of the upper bracket 26.

In the foregoing embodiment, the cone disc spring 76 is used as the urging member, but not limited to this, another urging member such as coil spring may be used.

In the embodiment, the bolt 64 is provided in the mounting stay 24 so as to protrude downward, and the upper bracket 26 and the guide rail 81 are fixed to the mounting stay 24 by screwing the nut 65 onto the bolt 64. Instead, for example, a mounting hole having threaded grooves may be formed in the mounting stay 24, and by screwing the bolt into the mounting hole, the upper bracket 26 and the guide rail 81 may be fixed in the mounting stay 24. In this case, the bolt corresponds to the fastening device.

In the foregoing embodiment, the invention is applied to a steering device having a tilt adjusting mechanism and a telescopic adjusting mechanism. Instead, the invention may be also applied to a steering device having either one of a tilt adjusting mechanism and a telescopic adjusting mechanism, or to a steering device having none of these functions.

In the foregoing embodiment, the steering device 1 is configured as a column-assisted electric power steering (EPS) device for applying assist force to the output shaft 16, which is a part of the column shaft 4. Instead, however, the invention may be applied to a rack-assisted type, an EPS or hydraulic power steering device other than the column-assist type, or a non-assisted steering device.

Therefore, the present examples and embodiments are to be considered as illustrative and not restrictive and the invention is not to be limited to the details given herein, but may be modified within the scope and equivalence of the appended claims.

The invention claimed is:

1. A steering device for a vehicle, the device comprising:
a steering shaft having an axis;
a steering wheel coupled to the steering shaft;
a steering column that rotatably supports the steering shaft;
a fixed bracket fixed to a vehicle main body by way of a fastening device to support the steering column, the fixed bracket being arranged to be detached in a vehicle forward direction when a load of not less than a predetermined load acts in the forward direction of the vehicle;
a through hole formed through the fixed bracket along axial direction of the steering column;
a guide rail that moves the detached fixed bracket along the axial direction of the steering column; and
a restricting portion that restricts movement of the guide rail relative to the fixed bracket, wherein:
the guide rail has a fixed portion and a main body portion, the fixed portion being fixed to the vehicle main body by way of the fastening device, the main body portion extending along the axial direction of the steering column and inserted into the through hole, and the main body portion being provided to approach the vehicle main body through a fastening operation of the fastening device for fixing the fixed portion to the vehicle main body;
the restricting portion has a restricting member for restricting movement of the guide rail relative to the fixed bracket before the guide rail is fixed to the vehicle main body so as to hold the fixed bracket and the guide rail at a mounting position where the fixed bracket and the guide rail can be fixed to the vehicle main body; and
the restricting member is formed such that its restricting force for restricting movement of the guide rail relative to the fixed bracket becomes less as the guide rail approaches the vehicle main body by the fastening operation of the fastening device.

2. The steering device according to claim 1, wherein the restricting member locks the guide rail to restrict movement of the guide rail relative to the fixed bracket, and is formed such that a contact area between the restricting member and the guide rail is reduced as the guide rail comes closer to the vehicle main body.

3. The steering device according to claim 1, wherein:
the guide rail has a side plate portion extending along the vehicle widthwise direction;
the side plate portion has a front surface located at the vehicle front side, and a rear surface located at the vehicle rear side;
the restricting member has a positioning portion and a detent part for locking the guide rail;

the positioning portion abuts against the front surface of the side plate portion to position the guide rail relative to the fixed bracket along the axial direction of the steering column; and the detent part is hooked to the rear surface of the side plate portion, and is formed such that a contact area between the detent part and the rear surface of the side plate portion is reduced as the guide rail comes closer to the vehicle main body.

4. The steering device according to claim 3, wherein the detent part is provided such that the contact area with the rear surface of the side plate part is zero in a state where the fixed bracket and the guide rail are fixed to the vehicle main body.

5. The steering device according to claim 1, further comprising a buffer member provided in the through hole, wherein the buffer member is made of an elastic material and has a loose insertion hole for loosely inserting the main body portion.

6. The steering device according to claim 5, wherein:
the restricting member is made of an elastic material; and
the buffer member is formed integrally with the restricting member.

7. The steering device according to claim 1, wherein:
the fixed bracket has a fastening hole open toward the rear side of the vehicle for inserting the fastening device, and is fixed to the vehicle main body between the fastening hole and the fastening device by way of a capsule mechanism;

the capsule mechanism has a capsule abutting against the fixed bracket, and an urging member that is compressed through the fastening operation when the fixed bracket is fixed to the vehicle main body by way of the fastening device, and urging force of the urging member restricts a frictional force generated between the fixed bracket and the capsule when the fixed bracket is detached;

the fastening device is composed of a set of a bolt and nut or of one bolt; and the fixed portion of the guide rail is fixed to the vehicle main body by the set of a bolt and nut or by the one bolt with the urging member interposed between the fixed portion and the vehicle main body.

* * * * *